(12) United States Patent
Gardell et al.

(10) Patent No.: US 6,590,404 B2
(45) Date of Patent: Jul. 8, 2003

(54) FORCE AND CENTRALITY MEASURING TOOL

(75) Inventors: David L. Gardell, Fairfax, VT (US); Edward J. Sukuskas, Fairfield, VT (US)

(73) Assignee: International Business Machines Corp., Armonk, NY (US)

( * ) Notice: Subject to any disclaimer, the term of this patent is extended or adjusted under 35 U.S.C. 154(b) by 49 days.

(21) Appl. No.: 09/681,996

(22) Filed: Jul. 5, 2001

(65) Prior Publication Data

US 2003/0006791 A1 Jan. 9, 2003

(51) Int. Cl.[7] ............................................... G01R 31/02
(52) U.S. Cl. ..................... 324/755; 324/760; 324/158.1
(58) Field of Search ............................... 324/755, 727, 324/158.1, 760, 765; 73/152.51, 862.42

(56) References Cited

U.S. PATENT DOCUMENTS

| | | | | |
|---|---|---|---|---|
| 3,727,822 A | | 4/1973 | Umbaugh ..................... 228/1 |
| 4,121,049 A | * | 10/1978 | Roeber ........................ 177/211 |
| 4,697,049 A | * | 9/1987 | Peemoller et al. ........... 177/211 |
| 4,739,666 A | * | 4/1988 | Hafner et al. .................. 29/454 |
| 5,899,140 A | | 5/1999 | Yamamoto et al. ........... 100/35 |
| 5,984,165 A | | 11/1999 | Inoue et al. ............ 228/180.22 |

* cited by examiner

*Primary Examiner*—Kamand Cuneo
*Assistant Examiner*—Tung X. Nguyen
(74) *Attorney, Agent, or Firm*—Francis J. Thornton; Robert A. Walsh

(57) ABSTRACT

An assembly, including a tool for measuring an applied force and its centroid relative to the center of the tool. A method of measuring and adjusting a force and its centroid applied to a semiconductor chip in a socket by an abutting heat sink consisting of the steps of inserting the tool in the socket, applying a heat sink on the tool, measuring the applied force and its centroid with respect to the center of the tool, adjusting the heat sink until the centroid of the applied force is substantially aligned with the center of the tool, removing the heat sink and tool, from the socket, substituting a semiconductor chip for the tool and reapplying the heat sink whereby the centroid of the force applied by the heat sink is substantially aligned with the center surface of the semiconductor chip in the semiconductor device.

9 Claims, 3 Drawing Sheets

FORCE AND CENTRALITY MEASURING TOOL

FIELD OF INVENTION

This invention relates generally to tools and methods for measuring the force applied to a surface and more particularly to a tool that is capable of simultaneously measuring both the total force applied to the surface and the centroid of the force so applied and to a method of using the measured total force and centroid to alter either or both the measured total force and the position of the centroid of the force.

BACKGROUND OF INVENTION

It is well known that semiconductor devices must be and are extensively tested. Many such tests are usually performed after the semiconductor device has been partially completed. One such test is the process known as semiconductor device test and burn-in. This process is a widely known and used testing process for measuring the expected life of a semiconductor device. Typically the semiconductor device is tested after the semiconductor chip is mounted on a module base but before a module cap has been applied over the chip. To perform this test and burn-in, respective uncapped semiconductor devices are placed in respective sockets on a so-called Burn-In-Board (BIB) provided with a plurality of such sockets. The filled Burn-In-Board is then placed in an oven and heated while being electrically connected to a suitable test apparatus so that the semiconductor devices can be tested while being subjected to various electrical and temperature conditions.

Because the operation of the semiconductor device can, in itself, produce heat in the chip and because of convection currents in the oven, the temperature gradients across the surface of any one each chip can vary significantly from those across the surface of any other chip although all the chips are identical and are being subjected to the same electrical and/or oven temperature conditions. Without assurance that each chip is meeting the same temperature conditions, only an estimate of what can be expected in actual operation can be realized. Therefore, it is desirable that the temperature range and distribution across the entire surface of each chip under going the test be known, be closely controlled. To try and control the temperature range and distribution across the surface of each chip under going the test the prior art placed heat sinks against the surface of the chips.

It has been recognized that thermal contact between the heat sink and the device under treatment will be improved when increased force is applied to the device by the heat sink. However, increasing the force beyond certain limits may cause damage to the device without improving the temperature distribution or gradient. Therefore a means to measure and optimize the force applied by the heat sink to the chip has long been sought by the prior art.

Today, the presently available, state of the art burn-in equipment attempts to solve these problems by using substantially planar heat sinks that are provided with spring loading and gimbal action. Such heat sinks may also be coupled, for example to a microprocessor temperature controller, a temperature sensing means, heating and cooling means. Heat sinks similar to those used in Burn-In-Boards are also used in module handlers in which the semiconductor may under go additional more extensive electrical tests one module at a time.

Although the start of the art heat sinks have provided improved results, there still is no assurance that all the devices being tested are subjected to identical conditions even when an optimum force is applied, by the heat sink, to the chip.

SUMMARY OF THE PRESENT INVENTION

It has now been found, by the present inventors, that failure of the prior art to solve the above problem occurs because each respective heat sink in the burn-in board can fail to be positioned correctly with respect to the entire surface of its respective chip. For example even with the spring loaded, gimbal action heat sinks of the prior art, a heat sink may be improperly positioned in a socket such that it is not in contact with the surface of the underlying chip or in contact with only a single corner or edge of the chip surface. The result of this inaccurate positioning of the heat sink with respect to the surface of the chip will be large temperature gradients across the chip surface. Another result, for example, may be that the microprocessor controller will be unable to maintain proper chip temperature.

This inaccurate positioning of the heat sink can be caused, for example, by a twist in one of the electrical connectors or in the cooling or heating supply lines connected to the heat sink which can be so slight that a visual inspection would not uncover any error in the position of the heat sink.

The present inventors have now discovered that good thermal contact between the chip under test and the heat sink is a function of both the total force applied by the heat sink to the chip and the position of the centroid of the applied force with respect to the center of the chip.

The present invention is thus directed to a mechanism that will consistently and accurately provide for and permit the proper positioning of a heat sink with respect to a semiconductor device in a test socket by measuring not only the total amount of force applied by a heat sink to an underlying surface but also by measuring the centroid of the applied force, i.e., total amount of force applied by the heat sink, with respect to the center of the underlying surface.

With these measurements, the position of the heat sink, in the socket, can be adjusted until that the total force applied by the heat sink is substantially equal to the desired applied force and that the centroid of the applied force is substantially aligned with the center of the underlying chip surface.

The present invention is thus directed to a mechanism capable of simultaneously measuring both the total force applied to the surface and the centroid of the force so applied between a heat sink and an underlying chip surface.

The present invention is also directed to a method of measuring both the total force applied to the surface of a semiconductor device and the centroid of the applied force and repositioning the heat sink so that the total applied force and/or its centroid can be adjusted such that the total applied force is within a desired range and that the centroid of the applied force is substantially aligned with the center of the surface of the semiconductor chip.

More particularly, the present invention is an assembly, including an upper and a lower plate with a plurality of load cells therebetween for measuring the applied force and determining its centroid, with respect to the center of the surface of the upper plate.

If the surface of the heat sink is not substantially parallel with the surface of the upper plate, the centroid of the force, applied by the heat sink, will cause the amount of load registered by at least one of the three load cells to be different from that registered by the other two load cells. In such an instance the position of the heat sink is adjusted until the registered load of each of the load cell becomes substantially equal. Substantial equality between the load cell measurements means that the centroid of the force applied by the heat sink is substantially positioned over the center of the assembly. At this time the heat sink and assembly can be removed from the Burn-In-Board socket. A semiconductor device, having a chip thereon whose center is substantially identical to the center of the top plate of the assembly, is now substituted, in the socket, for the assembly and the heat sink applied to the surface of the semiconductor device. Because the heat sink is replaced in the socket, over the semiconductor device in exactly the same position as it was prior to the removal of the assembly, one can be assured that the heat sink will apply substantially the identical force to the semiconductor device as it applied to the assembly and that the centroid of the applied force is aligned with the center of the semiconductor device substantially the same as it was applied to the surface of the assembly.

The bottom plate of the assembly is positioned in a semiconductor device socket so that the top plate of the assembly will be in the same position as the surface of the chip mounted on a semiconductor device will be when the semiconductor device is placed in the socket. Thus the heat sink will contact the chip surface exactly as it contacted the top plate of the assembly thus assuring that the force in a manner identical to the semiconductor chip surface so that the force applied by the heat sink against the top plate of the assembly will be measured by the 3 load cells permitting the location of the center of the force to be determined with respect to the center of any semiconductor device later positioned in the socket.

The present invention thus provides a means of improving uniformity of the thermal contact between each heat sink and the semiconductor device it is in contact with regardless of the thermal interface used.

These objects, features and advantages of the present invention will become further apparent to those skilled in the art from the following detailed description taken in conjunction with the accompanying drawings wherein:

DESCRIPTION OF THE PREFERRED EMBODIMENT

Figure 1:
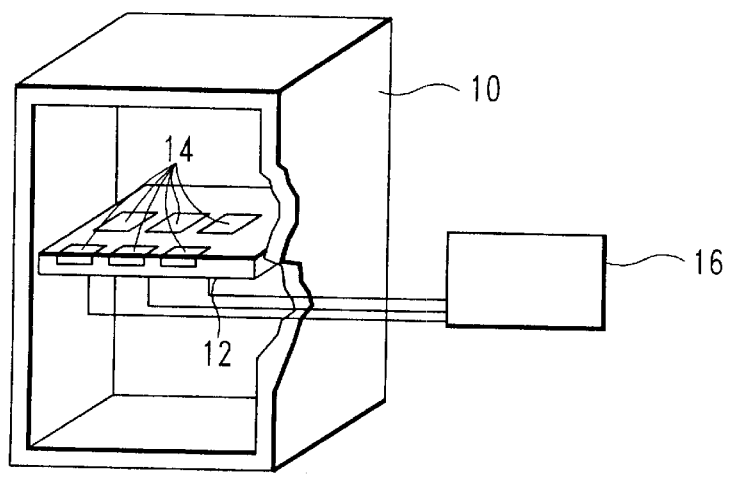
FIG. 1 is a partially sectioned view of an oven containing a burn-in-board having a plurality of chip sockets electrically connected to a test apparatus.
Figure 2:
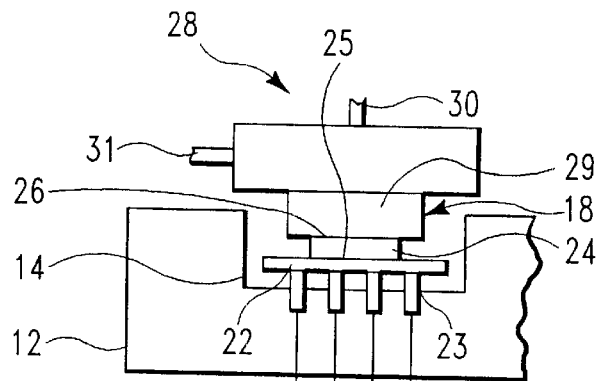
FIG. 2 is a sectional view of a semiconductor device positioned in a socket of a burn-in-board with a heat sink positioned thereon.
Figure 3:
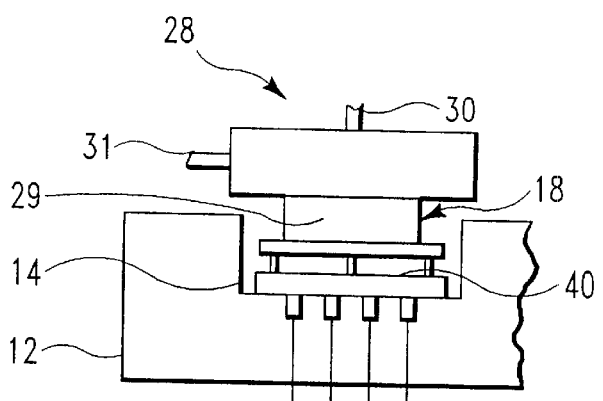
FIG. 3 is a sectional view of the assembly of the present invention positioned in a socket of a burn-in-board with a heat sink positioned thereon.
Figure 4:
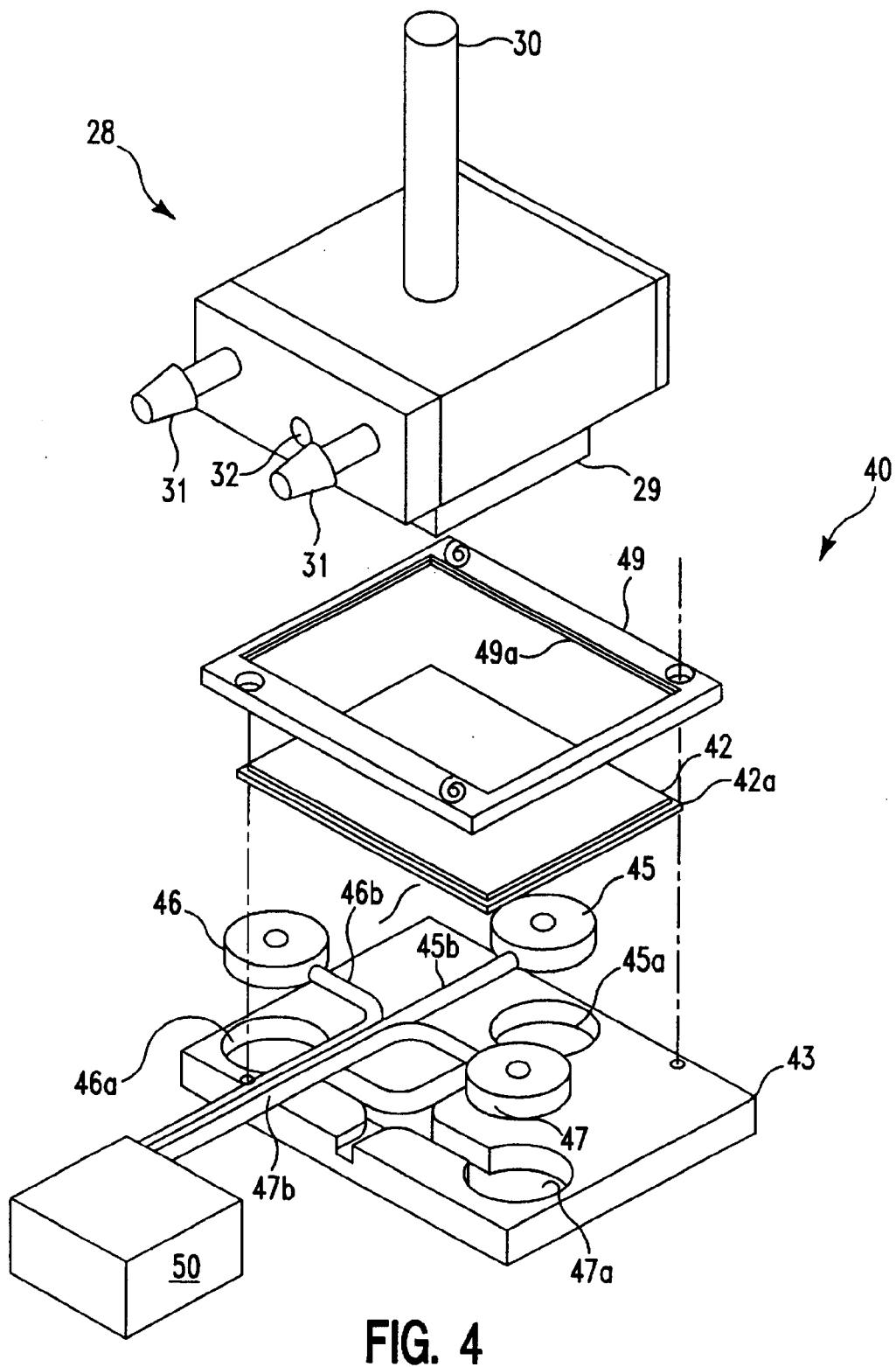
FIG. 4 is an exploded view of the assembly of the present invention.
Figure 5:
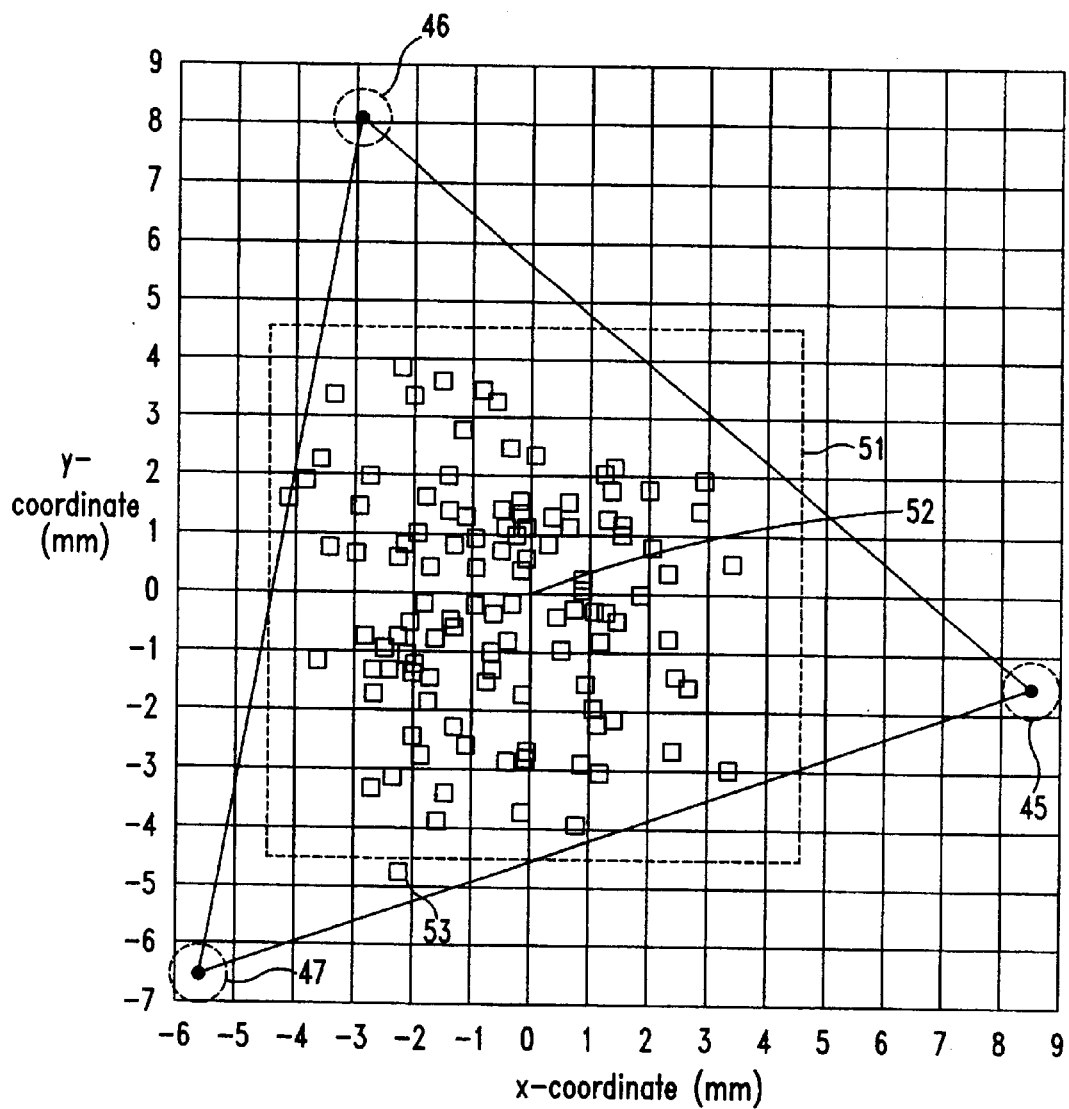
FIG. 5 depicts the positions of the centered of the load as measured on a plurality of assemblies.

A full appreciation of the features and advantages of the present invention can best be gained by reference to the drawings and more particularly to the FIGS. 1 through 5 where FIG. 1 is a partially sectioned view of an oven containing a burn-in-board having a plurality of chip sockets electrically connected to a test apparatus, FIG. 2 is a sectional view of a semiconductor device positioned in a socket of a burn-in-board with a heat sink positioned thereon, FIG. 3 is a sectional view of the assembly of the present invention positioned in a socket of a burn-in-board with a heat sink positioned thereon, FIG. 4 is an exploded view of the assembly of the present invention and FIG. 5 depicts the positions of the centroid of the load as measured on a plurality of assemblies.

FIG. 1 is a partially sectioned view of an oven 10 containing a burn-in-board 12 having a plurality of semiconductor device sockets 14 each of which is electrically connected to a test apparatus 16. Each semiconductor device socket 14, as shown in FIG. 2, is well known to the art and is adapted to accept a semiconductor device 18 comprised of a insulating base 22 provided with a plurality of pins 23 coupled via suitable wiring patterns to various active and inactive devices, i.e., transistors, resistors, capacitors and the like, formed in a semiconductor chip 24. In the present instance the active face 25 of the semiconductor chip 24, i.e. the face containing the active and inactive devices, is positioned against the base 22 while its back or inactive face 26 is exposed. When the semiconductor device 18 is complete a cover or heat sink (not shown) is typically placed over the chip 24 and secured to the base 22.

To perform a burn-in test each semiconductor device 18 that is to be tested is left uncovered and plugged into a respective burn-in socket 14 on a burn-in-board 12 and a respective heat sink 28 is placed against the exposed back or inactive face 26 of each respective semiconductor device as shown in FIG. 2. When all the sockets 14 on the board are filled with devices and have heat sinks disposed thereon, the burn-in-board 12 is inserted in the oven, connected to the tester 16 and the oven 10 heated. The heat sink 28 is provided with a base 29 adapted to lie flat on the back 26 of the semiconductor chip. Typically the heat sink 28 is also provided a temperature sensing unit 30 wired to a suitable temperature measuring device (not shown) and with an internal cooling coil (not shown) connected to a suitable source of coolant via cooling lines 31. The heat sink is thus designed so that the lower surface of the base 29 will substantially cover and contact the back surface face 26 of the chip 24 so that the chip 24 can be maintained at a selected temperature thereby prevent overheating of the chip and premature failure of the chip. Since such heat sinks are well known to the art and commercially available, further description of these heat sinks is not deemed necessary.

At times however, because of problems, which may not be readily visible, such as a kink or a twist in one of the wires or cooling lines coupled to the heat sink, the lower base 29 of the heat sink is not properly seated on the back of the chip and cannot provide the desired or expected cooling of the chip such that either the chip overheats or there is a wide variation in the temperature across the surface of the semiconductor chip.

Tests, performed by the present inventors on a 15 millimeter square chip running at 100 watts, determined that practicing burn-in using the prior art techniques where the heat sinks are placed against the chip surface without measuring either the total force applied to the surface of a semiconductor device or the centroid of the applied force or repositioning the heat sink as taught by the present invention could result in temperature variations of up to over 100 degrees Celsius across the face of the chip.

However when the total force applied to the surface of a semiconductor device or the centroid of the applied force was measured on the same 15 millimeter square chips and, as taught by the present invention, the heat sinks were repositioned so that the total applied force fell within the desired range of 10 to 15 pounds and the centroid of the applied force was aligned to within 1.5 mm of the center of the surface of the semiconductor chip the temperature variations across the surface of the chips fell to less than 40 degrees Celsius.

The present invention is thus designed to avoid this problem of temperature variation across the face of the chip and, as shown in FIGS. 3 and 4, uses an assembly 40 that can be inserted in each socket 14 in the burn-in-board 12 in lieu of the semiconductor device 8. The assembly 40, as will be further described below, is designed to provide information that will permit both the measurement of the total force applied by the base 29 and its centroid.

The assembly 40 of the present invention, thus permits corrections to be made to the seating of the heat sinks 28 prior to the insertion of actual semiconductor devices in the burnin-board sockets so when actual semiconductor devices are inserted in the Burn-in-Board sockets that the correct total force will be applied thereto and that the centroid of the applied force will be satisfactorily positioned with respect to the center of the chip. In the event that a heat sink base 29 cannot be adjusted in a socket such as to apply either the correct amount of total force or to properly position the centroid of the applied force with respect to the center of a chip placed in the socket, the socket will be deemed defective and left empty of a semiconductor device during testing.

As more fully shown in FIG. 4 the assembly 40 comprises first and second parallel plates 42 and 43, separated by three triangularly spaced load cells 45, 46 and 47 each of which is coupled by a respective lead 45b, 46b and 47b to a piece of test equipment 50 that is designed or programmed to measure the load applied to each of the cells 45, 46, and 47 and calculate the centroid of the applied force with respect to the center of the upper plate 42. Because the assembly 40 is to placed into a respective burn-in socket 14 on a burn-in-board 12 in lieu of a semiconductor device, the assembly 40 is designed to be no thicker than the semiconductor device for which it is being substituted. However it should be understood that the lower plate 43 of the assembly 40 is as large as the device insulating base 22. It should also be understood that the upper plate 42 of the assembly may be considerably larger than the chip 24 on the semiconductor device that is to be tested.

Once the assembly 40 is placed in the burn-in-board socket 14 a respective heat sink 28 is inserted into the socket 14 so that its lower surface 29 abuts the exposed top surface 42a of the upper plate 42. That is the heat sink 28 is placed against this top surface, in the same manner that it would be placed against the back surface of a semiconductor device.

The load cells 45, 46 and 47 are located in recesses 45a, 46a and 47a formed in the lower plate 43 and the top plate 42 is secured thereon. To assure that the centroid of the applied force will be accurately measured it is necessary that the load cells 45, 46 and 47 be positioned beyond the perimeter of the chip that will be tested in the burn-in-board. To this end, the upper plate 42 of the assembly is also substantially larger than the chip it is being substituted for. This is particularly shown in FIG. 5 where the load cells are indicated at the points of the triangle formed by the load cells and the size of chip 18 is indicated by the dotted insert.

The load cells, in FIG. 5, are positioned at the apexes of an equilateral triangle centered over the chip position. This layout has the advantage that when the load is perfectly centered, the three load cells will measure identical forces. It should also be understood that the triangle formed by the three load cells need not be an equilateral triangle. It should also be understood that more than three load cells can be used and that they can be arranged in other than triangular form, for example, the device could have four load cells with each cell positioned beneath a respective one of each of the 4 corners of the top plate 42.

As shown in FIG. 4, the top plate 42 is slightly smaller than the lower plate 43 but substantially larger than the chip for which it is being substituted. This top plate 42 is provided with a flange 42a so that it can be loosely secured in a square ring 49 by a rabbet 49a let into the lower inner edge of the ring 49. In this way when the ring 49 is secured to the lower plate 43, the upper plate 42 although restrained by the ring is still free to move within the ring 49 under the stimulus of a force applied by the heat sink base 29 contacting the upper plate 42. It should be clear that the plate 42 fits loosely within the ring 49. When the base 29 of the heat sink contacts the upper plate 42, the upper plate 42 is forced against the load cells 45, 46 and 47 so that each load cell produces a signal that is proportional to the amount of force applied thereto. If the base 29 is tilted with respect to the upper plate 42 each of the load cell will experience a different loading. As is well known to the art, the centroid of the load can readily be calculated using the principal that the summation of the moments about any axis is equal to zero. Generally the moments are summed about the device X axis and Y axis. Thus, the location of the centroid is easily calculated. This has been repeated for a large number of heat sinks in a burn in oven with the results shown in FIG. 5.

FIG. 5 depicts the positions of the centroid of the load with respect to where the center 52 of a chip 51 would be located as measured on a plurality of assemblies before any corrective action in positioning of the heat sinks was undertaken. In this FIG. 5, the cells 45, 46 and 47 are indicated in phantom. The perimeter of a nine millimeter square chip 51 also indicated in phantom.

It is to be noted that one centroid 53 is located outside the perimeter of the chip 60 indicating that a chip placed in this socket would be contacted by only one edge of the heat sink unless corrective action was undertaken.

Ideally any corrective action would result in the centroid of the applied force being positioned exactly on the center of the chip. However it has been found, for all practical purposes, that if the corrective action of repositioning the heat sink results in the centroid becoming relocated to within 3.0 millimeters of the center of a 9 mm chip that satisfactory burn-in results can be realized.

The present invention thus provides a simple, cost effective method of assuring that the force applied by a heat sink to a semiconductor chip positioned in a burn-in-board will be substantially located on the center of the chip to be tested independent of the chip's design.

It will be obvious to one skilled in the art that the present invention is well suited for optimizing heat sink contact in many types of module test or module burn-in equipment or with modules that have covers or lids or plastic encapsulations. Some types of test or burn in equipment have the ability to adjust for variations in device thickness by altering the location of the heat sink, in this case it may be desirable to make the assembly thicker then the device. The invention is equally well suited for use with any type of heat sink such as air or liquid cooled and passive or actively controlled.

This completes the description of the preferred embodiment of the invention. Since changes may be made in the above construction without departing from the scope of the invention described herein, it is intended that all the matter contained in the above description or shown in the accompanying drawings shall be interpreted in an illustrative and not in a limiting sense. Thus other alternatives and modifications will now become apparent to those skilled in the art without departing from the spirit and scope of the invention as set forth in the following claims.

What is claimed is:

1. An apparatus for measuring the relative force and the centroid of the force applied to a surface comprising:

an assembly comprising;

a planar lower plate having a known area and perimeter with at least three spaced recesses formed in said lower plate around a central region of said lower plate and within said known perimeter;

a respective load cell positioned in each recess in said lower plate;

a planar upper plate smaller than said planar lower plate but large enough to cover said recesses and said central region between said spaced recesses positioned over said lower plate and in direct contact with said cells;

a tester for measuring the load applied to each respective load cell and determining the centroid of the force applied to a plurality of said load cells;

each respective load cell have means for coupling each such cell to said tester; and a ring secured to the perimeter of said lower plate for retaining the upper plate on said lower plate over said cells such that the upper plate is free to move towards the lower plate under the stimulus of a force applied to said upper plate that will act to force said upper plate towards said lower plate and in direct contact with said load cells;

whereby each respective load cell will provide, to said tester, a signal proportional to the amount of force applied thereto by said upper plate to said load cells from which the centroid of the applied force may be determined.

2. The assembly of claim 1 wherein said planar upper plate has upper and lower parallel surfaces;

said planar lower plate has upper and lower parallel surfaces;

said plurality of load cells being positioned between the upper surface of said second plate and the lower surface of said first plate; and said test equipment includes a measuring circuit coupled to said load cells for measuring the focal point of a force applied to said upper plate and for determining the relative position of said focal point with respect to the center of said upper plate.

3. The assembly of claim 1 wherein each of said load cells is positioned a known distance from each adjacent load cell.

4. The assembly of claim 1 wherein each of said load cells is positioned an equal distance from each adjacent load cell.

5. The assembly of claim 1 wherein said central region is an equilateral triangle and each of said recesses is positioned at the apex of said equilateral triangle.

6. The assembly of claim 1 wherein each of said load cells is positioned a known distance from each adjacent load cell and the center point of the assembly.

7. A method of measuring and adjusting the total force to be applied to the surface of a semiconductor chip positioned in a test socket by an abutting heat sink consisting of the steps of: selecting a test socket, selecting an assembly, consisting of an upper and a lower plate having three load cells positioned therebetween; positioning the assembly in said socket; selecting a heat sink; positioning the heat sink in a first position against the upper plate of the assembly; measuring the output of the load cells when said heat sink is positioned on said upper plate of said assembly; determining the total force applied by said heat sink to said upper plate of said assembly; determining the centroid of the force applied by said heat sink on upper plate of said assembly with respected to a selected position on said upper plate; repositioning the heat sink to change the centroid of the force applied by said heat sink with respect to said selected position on upper plate of said assembly; determining the centroid of the force applied by said repositioned heat sink with respect to said selected position on upper plate of said assembly; repeating said positioning and determining steps until the centroid of the force applied by said repositioned heat sink substantially matches said selected position on said upper plate of said assembly; removing said heat sink and said assembly from said socket; inserting a semiconductor device having a semiconductor chip thereon in said socket; and replacing said heat sink in the last position where the centroid of the force applied by said repositioned heat sink substantially matched the selected position on upper plate of said assembly.

8. The method of claim 7 wherein said test socket is positioned in a Burn-In-Board.

9. The apparatus of claim 1 wherein said ring has a rabbet let into its inner, lower edge to retain said upper plate in position over said lower plate.

* * * * *